United States Patent
Clynch

[15] 3,658,148
[45] Apr. 25, 1972

[54] LAND VEHICLE RELEASABLY CARRYING A GEOPHYSICAL EXPLORATION TOOL

[72] Inventor: Frank Clynch, Houston, Tex.
[73] Assignee: Dresser Industries, Inc., Dallas, Tex.
[22] Filed: Apr. 29, 1970
[21] Appl. No.: 32,864

[52] U.S. Cl. ..........................181/.5 VM, 181/.5 H, 214/390
[51] Int. Cl. .............................................G01v 1/02
[58] Field of Search.........................214/390, 392; 181/.5 VH

[56] References Cited

UNITED STATES PATENTS

| | | | |
|---|---|---|---|
| 3,374,853 | 3/1968 | Kilmer | 181/.5 VM |
| 3,024,931 | 3/1962 | Grover et al. | 214/390 X |
| 3,295,630 | 1/1967 | Kilmer | 181/.5 VM |
| 3,310,128 | 3/1967 | Chelminski | 181/.5 VM |
| 3,396,861 | 8/1968 | Houlton | 214/392 |
| 3,405,780 | 10/1968 | Coburn et al. | 181/.5 VM |

Primary Examiner—Benjamin A. Borchelt
Assistant Examiner—N. Moskowitz
Attorney—Robert W. Mayer, Daniel Rubin, Raymond T. Mazesko, Ray L. Van Winkle, William E. Johnson, Jr., Thomas P. Hubbard and Eddie E. Scott

[57] ABSTRACT

A land moving vehicle for carrying a geophysical exploration tool between the ends of the vehicle in a normal upward position and adapted to lower the tool onto the ground for surveying in which the tool is releasably connected to the vehicle. The vehicle having a first frame with ground moving means and including a longitudinal opening extending through one end in which the tool is releasably positioned and a second frame pivotly connected to the first frame at the second end, and means for raising the first end of the second frame relative to the first end of the first frame for removing or inserting the tool. The tool support including lifting and guide means and adapted to be releasably connected to the frame adjacent the longitudinal center of gravity of the vehicle.

12 Claims, 4 Drawing Figures

Frank Clynch
INVENTOR.

BY James F. Weiler
William A. Stout
ATTORNEYS

Frank Clynch
INVENTOR

BY James L. Weiler
William A. Stout
ATTORNEYS

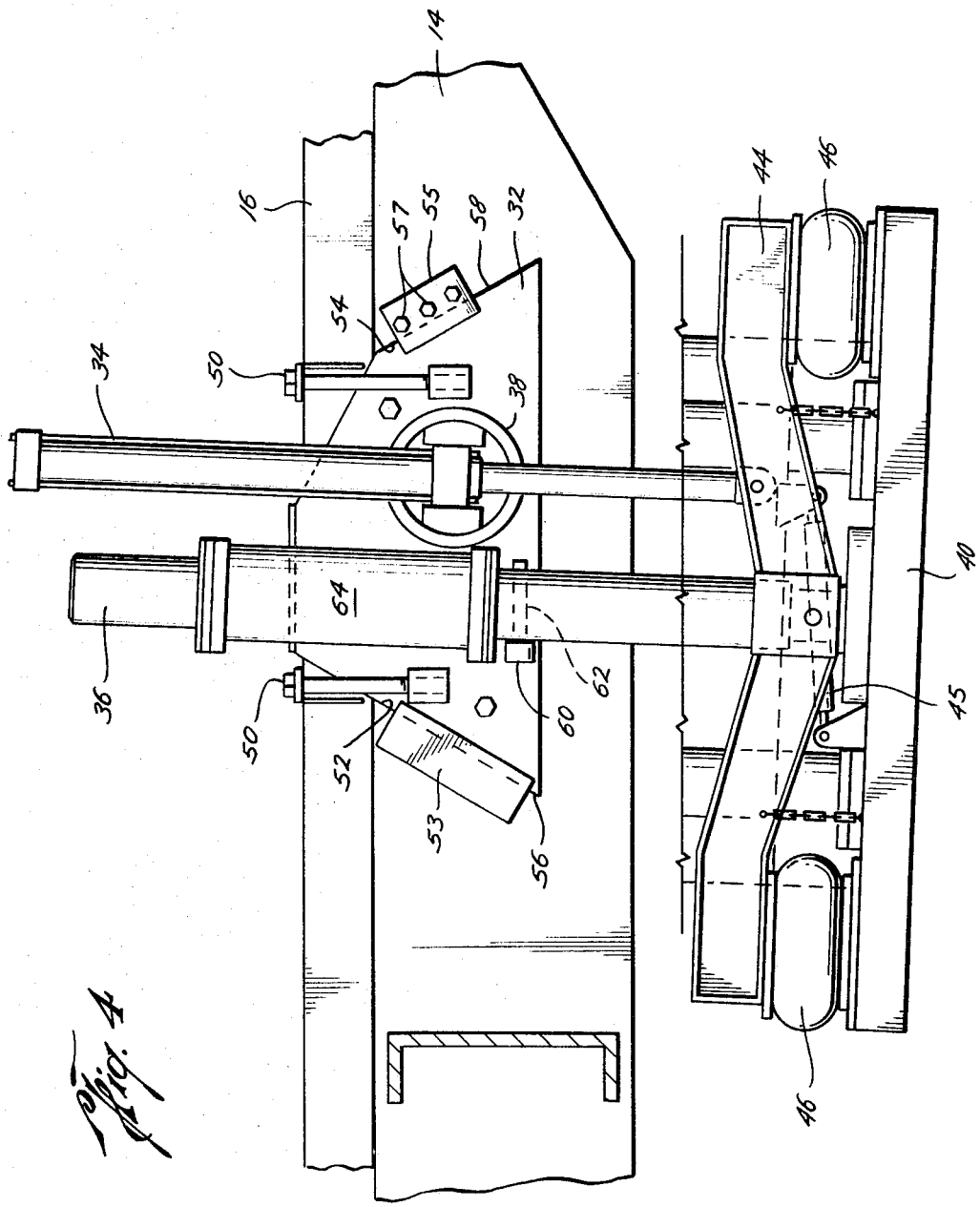

LAND VEHICLE RELEASABLY CARRYING A GEOPHYSICAL EXPLORATION TOOL

BACKGROUND OF THE INVENTION

The present invention is directed to a land moving vehicle for moving over rugged and off the road terrain for carrying a geophysical exploration tool for making seismic surveys and prospecting. A conventional geophysical tool such as a vibrator is bulky and heavy and in the past it has been difficult and time-consuming to carry the vibrator above the ground over rugged terrain and thereafter place the vibrator on the ground for conducting seismic surveys and for quickly and easily connecting and releasing the vibrator from the vehicle when necessary for replacement or to make repairs or otherwise disconnect the vibrator.

The present invention is directed to various improvements in a land moving vehicle for releasably carrying a geophysical exploration tool between the ends thereof for greater stability in which the tool may be raised for transportation purposes and may be lowered for making a seismic survey and in which the vibrator may be quickly and easily released from the vehicle as desired.

SUMMARY

The present invention is directed to a land moving vehicle having a first frame with ground moving means thereon and including a longitudinal opening extending through the first end of the frame in which a geophysical exploration tool is positioned, preferably at approximately the longitudinal center of gravity of the vehicle for increased stability, with a second frame pivotally connected to the first frame at the second end with means for releasably connecting the tool to at least one of the frames, and means for raising at least the first end of the second frame relative to the first end of the first frame so that the vehicle may receive or detach itself from the tool.

A still further object of the present invention is the provision of a support connected to the geophysical tool and adapted to be releasably connected to at least one of the frames with vertical guide means between the support and the tool for guiding the vertical movement of the tool and lifting and lowering means connected between the tool and the support for lifting the tool for transportation and lowering the tool for surveying.

A still further object of the present invention is the provision of a support slidably connected to the geophysical tool for attachment to a land carrying vehicle having first and second frames pivoted together at one end and including locking means on the top frame for locking the support to the top frame and including coacting engaging surfaces between the support and the bottom frame for engagement when the tool is locked to the top frame thereby supporting the tool from both frames and holding the frames together while the tool is attached.

A still further object of the present invention is the provision of a support slidably connected to a geophysical tool for connection to a land moving vehicle having first and second moving frames pivoted at one end with a longitudinal opening through the bottom frame wherein the support means is releasably locked to the top frame and includes coacting engaging wedge surfaces between the support and the lower frames for guiding and securing the support thereto with the coacting surfaces at the side nearest the opening being releasable for ease of releasing the tool from the vehicle.

Yet a further object of the present invention is the provision of a land moving vehicle for releasably carrying a geophysical tool in which the vehicle can release or pick up the tool with its own power and without requiring auxiliary equipment and in which the tool support securely holds the tool in a low center of gravity position and allows a smooth raising and lowering of the tool without rotational movement relative to the vehicle, and in which provision is made in the support raising and lowering assembly for holding the vehicle off the ground.

BRIEF DESCRIPTION OF THE DRAWINGS

FIG. 4 is a fragmentary cross-sectional view taken along the line 4—4 of FIG. 3.

DESCRIPTION OF THE PREFERRED EMBODIMENT

Figure 1:
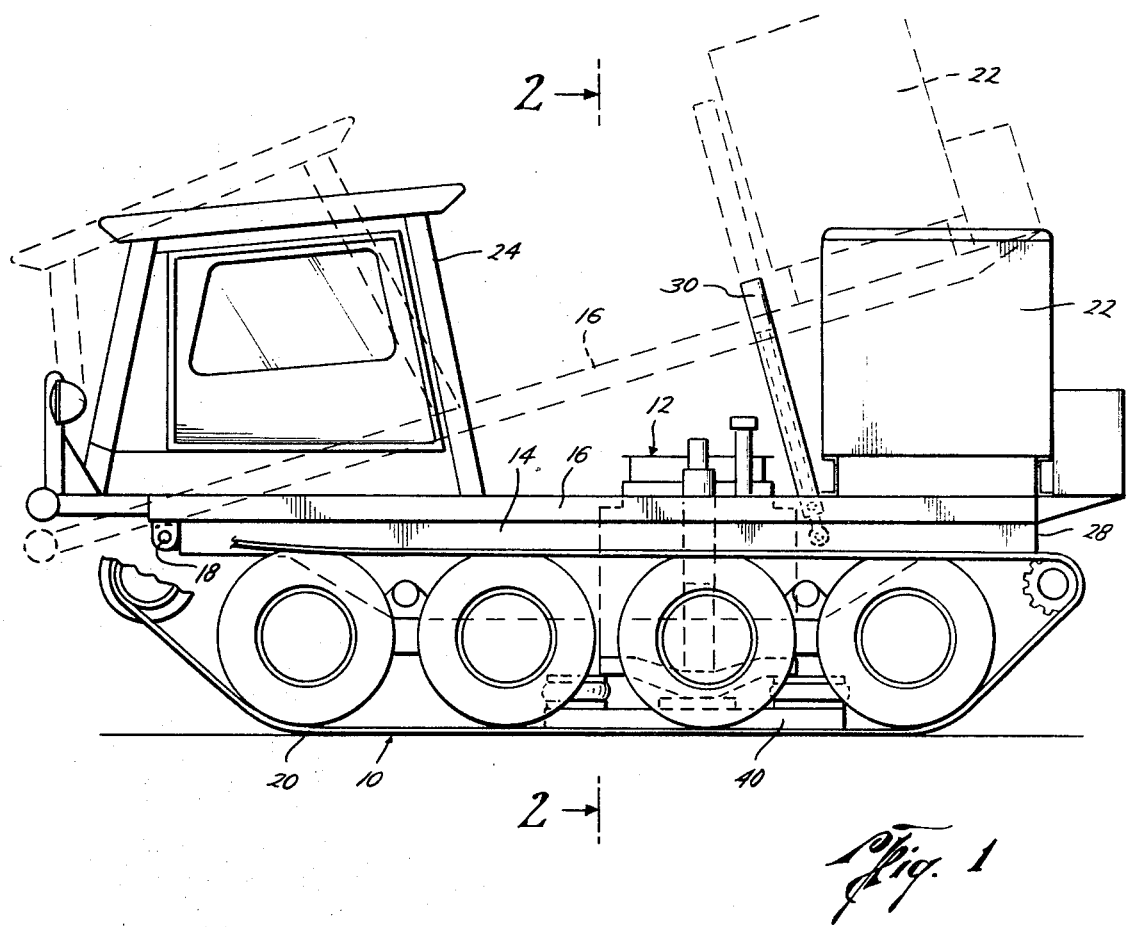
FIG. 1 is an elevational view of the land moving vehicle of the present invention connected to a geophysical tool such as a vibrator and shown in the solid outline in the surveying position and shown in the dotted outline with the upper frame raised to allow removal or attachment of the vibrator.

Referring now to the drawings, and particularly to FIG. 1, the reference numeral 10 generally indicates the land moving vehicle of the present invention for releasably carrying any conventional and suitable geophysical exploration tool which is coupled to the earth to produce seismic energy transmission. The tool may be, by way of example only, a vibrator, such as generally indicated by reference numeral 12 which may be a hydraulically actuated impact vibrator provided under the trademark "VIBROSEIS." The vehicle 10 generally includes a first lower frame 14 and a second top frame 16 pivotally connected together at pivot 18 for reasons which will be more fully discussed hereinafter. The first frame generally carries suitable ground carrying means such as tracks 20 for self-propelling the vehicle 10 and the second frame 16 generally includes a power source 22 such as a diesel engine, the cab 24 and associated control and power equipment for the vehicle and the vibrator 12, all of which are conventional and which have been omitted from the drawing for ease of convenience.

It is to be noted that the first frame 14 includes an opening 26 (FIG. 3) longitudinally extending through the first end 28 of the vehicle 10 whereby the vehicle 10 may back up to enclose and receive the vibrator 12 in said opening 26 for attachment or after the vibrator 12 has been detached from the vehicle 10 may drive away leaving the vibrator 12 as will be more fully described hereinafter. Suitable means are provided for raising the first end of the second frame 16 relative to the first end of the first frame 14, as indicated in dotted outline in FIG. 1, such as hydraulic piston and cylinder assemblies 30. Thus, when the second frame 16 is raised and pivoted around the pivot 18 the second frame 16 and the equipment thereon is spaced above the longitudinal opening 26 a sufficient distance to allow the vibrator 12 to be inserted and removed therein by the movement of the vehicle 10.

Figure 2:
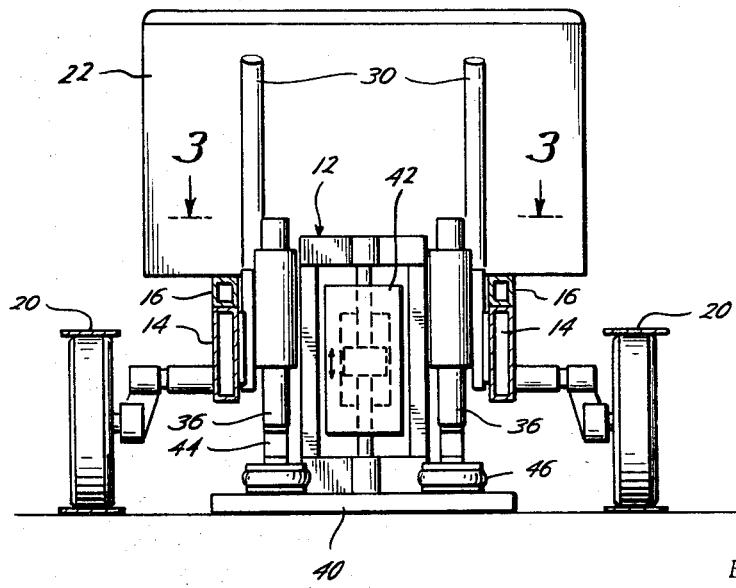
FIG. 2 is a cross-sectional view taken along the line 2—2 of FIG. 1.
Figure 3:
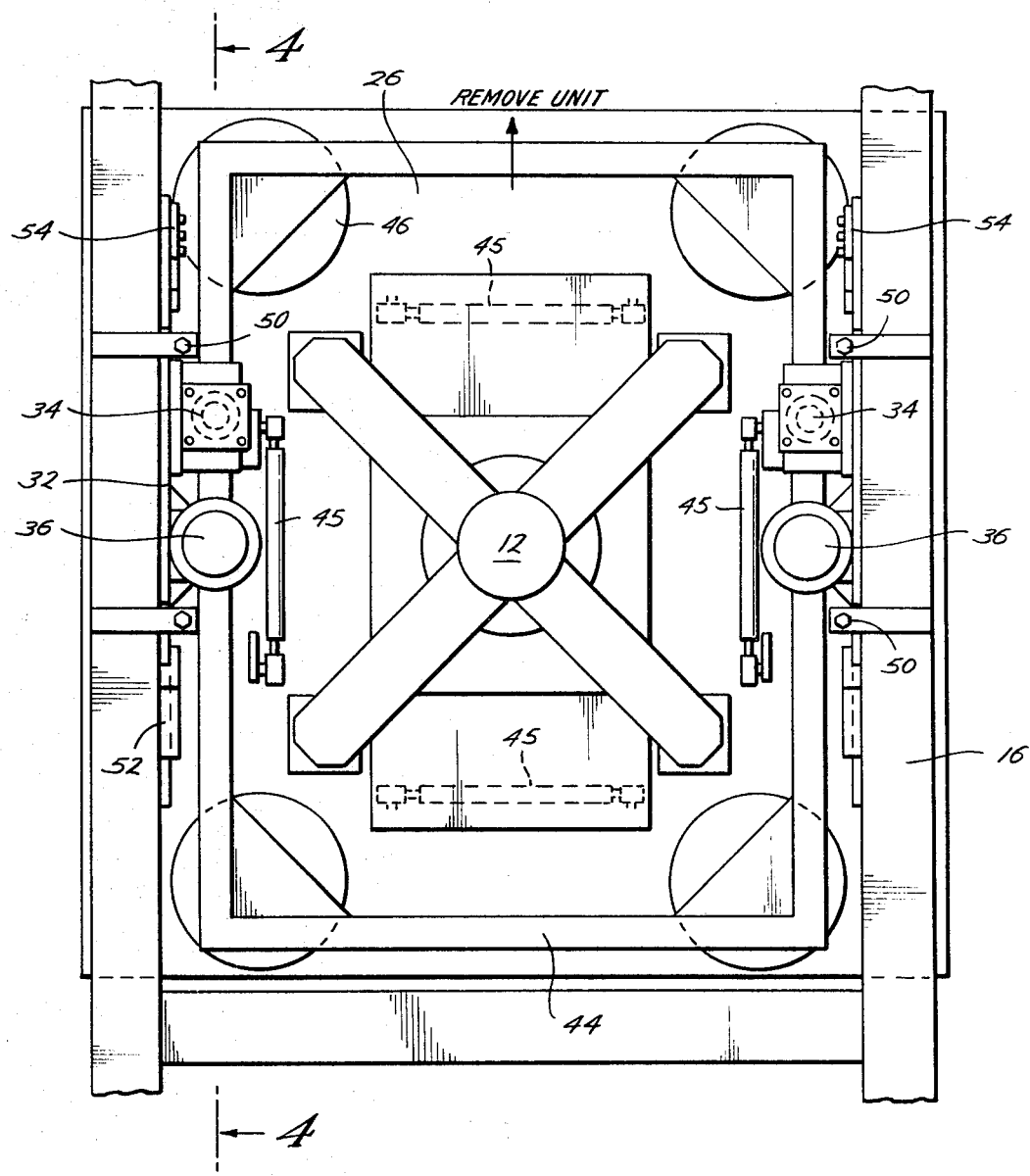
FIG. 3 is a fragmentary cross-sectional view taken along the line 3—3 of FIG. 2.

Suitable means are provided for releasably connecting the vibrator 12 to at least one of the frames 14 and 16 in the opening 26 and between the ends of the vehicle 12, preferably at approximately the longitudinal center of gravity of the vehicle to provide stability as the vehicle 10 travels off the road and over rough and rugged terrain. Additionally, it is desirable to carry the tool or vibrator 12 as low as possible for the same reasons. Referring now to FIGS. 2-4, a support 32 is provided on each side of the vibrator 12 and is adapted to be releasably connected to at least one of the frames 14 and 16.

Lifting and lowering means such as hydraulic piston and cylinder assemblies 34 are connected between each support 32 and the vibrator 12. Thus, when the support 32 is attached to the frame, the vibrator 12 may be raised up from the ground for ease of transportation by the vehicle 10 and for lowering the vibrator 12 onto the ground at the desired location for making a seismic survey. In addition, vertical guide rods 36 are provided between each support 32 and the vibrator 12 as it is moved upwardly and downwardly by the piston and cylinder assemblies 34. Preferably, the piston and cylinder assemblies 34 are rotatably connected to the support 32 by a rotatable joint 38 to allow for movement of the base of the vibrator 12. The joint 38 allows the coupling base 40 to conform to uneven terrain without the vehicle 10 being at the same angle.

The vibrator 12 generally includes a base 40 which is connected to and receives the jarring impulses from the hydraulic jarring mechanism 42 as best seen in FIG. 2 and a vibratory support frame 44, as seen in FIGS. 2, 3 and 4, is provided resting upon vibrator insulators 46 to which the lower end of the lifting piston and cylinder assemblies 34 are connected. Thus, after the base plate 40 is lowered onto the ground additional downward movement of the hydraulic piston and cylinder assemblies 34 may lift the vehicle up and support it on the frame 44 and will provide a sufficient steady state force on the base plate 40 to make good contact and acoustical connection of the vibrator 12 to the ground. Of course, the vibratory insulators 46 will prevent any undesired vibration on the vehicle 10 from being transmitted from the base plate 40 and to the vibrator 12. Frame 44 is rigidly connected to the tool 12 as well as the guide rods 46 and lifting assemblies 34 thereby keeping the tool at a low center of gravity, reducing the upper clearance, and eliminating the need to fully synchronize the movement of the lifting assemblies 34.

In addition, nonrotatable means as the tie rods or horizontal torsion bars 45 (FIGS. 3 and 4), are provided between the frame 44 and the base plate 40 to allow vertical rotational movement of the base 40 relative to the vehicle 10, but preventing any relative rotational movement therebetween. Thus, when the tool 12 is in the up position and being transported the base 40 will not rotate and damage the air cushion insulators 46. And when the base 40 is on the ground and the vehicle 10 is raised, relative movement is prevented.

Thus, it is noted that the supports 32 are vertically slidable relative to the vibrator 12 and when the vibrator 12 is resting on the ground the supports 32 may be suitably raised into place for connection to the vehicle 10 by any suitable means or lowered away from the frames 14 and 16 for releasing the vibrator 12 from the vehicle 10. Preferably, the supports 32 are releasably connected to the top frame 16 by one or more bolts 50 and preferably the lower frame 14 includes coacting engaging surfaces to engage a support 32 such as guide tracks 52 and 54 on either side of the vibrator 12 which coact with engaging shoulders 56 and 58, respectively, on the support 32. In addition the coengaging surfaces include plates 53 and 55 connected to frame 14 and overlapping the edges of support 32 thereby preventing transverse as well as longitudinal movement of the support 32 relative to frame 14. Thus, as the bolts 50 draw the support 32 upwardly into the guide tracks 52 and 54, the coacting surfaces are wedged together thereby guiding the support 32 into the proper position and providing greater stability of the support 32 from both the upper frame 16 and the lower frame 14 as well as holding the frames 14 and 16 in position against each other. Of course, with tool 12 on the ground the lifting cylinders 34 may be used to position the supports 32 in the guide tracks 52 and 54 and the bolts 50 need be merely tightened as the coengaging surfaces correctly align the bolts in position. Preferably, the plates 55 are releasably connected to the frame 14 by bolts 57 as plates 55 are nearest the first end 28 and their release is useful in the event that the terrain does not permit the support 32 to be lowered entirely free and clear of the guide tracks 52 and 54. In that event, the back plates 55 may be released from the frame 14 to still allow the vibrator to be releasably disconnected from the vehicle 10.

Mechanical means for holding the vehicle 10 up in the air and off of the ground overnight is particularly useful in cold climates so that the tracks 20 and actuating components can be started under no load conditions and warmed up to operating temperatures. Of course, the piston and cylinder assemblies 34 and guides 36 will lift the vehicle 10 up off the ground allowing the vehicle to be supported by the base 40, but generally there will be sufficient leakage overnight in the assemblies 34 to allow the vehicle 10 to be lowered to the ground. Therefore, suitable mechanical means such as pins 60 may be inserted into holes 62 in the guides 36 positioned so as to abut the lower end of guide tubes 64 when the vehicle is in the raised position and thus mechanically hold the vehicle 10 in the raised position.

In use, the vehicle 10 is particularly adapted to move across rugged terrain and quickly and easily make a geophysical survey and can easily release or pick up a geophysical exploration tool such as vibrator 12 without the need of special equipment and thus can quickly change out vibrators 12 when needed to because of repairs or other reasons. When it is desired to attach a vibrator 12 to the vehicle 10, the piston and cylinder assemblies 30 are actuated to raise the top frame 16 relative to the track bearing frame 14 around the pivot 18 thereby clearing the space above the longitudinal opening 26 in the lower frame at the end 28. The vehicle 10 may then back up about the vibrator 12 to position the vibrator 12 in the longitudinal opening 26 in the first frame 14. The supports 32 may then be quickly attached to the bolts 50 and wedged in the guide tracks 52 and 54 to securely support the support 32 from the tracks 14 and 16. The lifting and lowering cylinder and piston assemblies 34 may then be actuated to raise the vibrator 12 into the carrying position off of the ground. The vehicle 10 may then be self-propelled to the desired location at which it is desired to make a survey and the piston and cylinder assemblies 34 may be actuated to lower the vibrator 12 onto the ground and in fact raise the vehicle 10 upwardly on the frames 44 to obtain a good acoustical coupling between the base 40 of the vibrator 12 and the ground for conducting the seismic survey. After the survey is complete, the vibrator 12 is then retracted by the assemblies 34 and transported as desired. The vibrator 12 may be quickly and easily released from the vehicle 10 by reversing the attaching procedure. And, particularly in cold climates, the vehicle 10 can be raised off the ground overnight by the assemblies 34 and pins 60 inserted into holes 62 in the guides 36 to hold the vehicle off the ground for starting and running in the no load position the next morning prior to lowering.

The present invention, therefore, is well adapted to carry out the objects and attain the ends and advantages mentioned as well as others inherent therein.

What is claimed is:

1. A land moving vehicle for releasably carrying a geophysical exploration tool comprising, a first frame having ground moving means and including a longitudinal opening extending through the first end of the frame, a second frame pivotally connected to the first frame at the second end of the first and second frames, means for raising the first end of the second frame relatively to the first end of the first frame, and means for releasably connecting the geophysical tool in said longitudinal opening between the ends of the frames to at least one of the frames, said releasably connecting means including a support connected to the tool and adapted to be releasably connected to at least one of the frames, vertical guide rods connected between the support and the tool for guiding the vertical movement of the tool, and lifting and lowering means connected between the tool and the support for lifting the vibrator for carrying and lowering the tool for surveying, wherein the tool further includes a ground engaging base plate and the support includes means between the support and the base plate allowing vertical movement of the plate relative to the support, but preventing rotational movement of the plate relative to the support about a vertical axis.

2. The apparatus of claim 1 including, locking means on the second frame for locking the support to the second frame, coacting engaging surfaces between the support and the first frame for engagement when the vibrator is locked to the second frame.

3. The apparatus of claim 2 wherein the coacting surfaces are at each end of the support and are at an angle to the vertical for guiding and supporting the support.

4. The apparatus of claim 3 wherein the coacting surfaces nearest the first end of the frame include portions releasably connected to the frame.

5. The invention of claim 1 including mechanical means connected to the support for holding the vehicle in a position off the ground.

6. The invention of claim 5 wherein the mechanical means include a pin, and the guide rod includes a hole for receiving the pin.

7. The apparatus of claim 1 wherein the tool is carried by the vehicle at approximately the longitudinal center of gravity of the vehicle.

8. A land moving vehicle for releasably carrying a geophysical vibrator having a ground engaging base plate comprising, a first frame having ground moving means and including a longitudinal opening extending through the first end of the frame, a second frame positioned above and pivotally connected to the first frame at the second end of the first and second frames, means for raising the first end of the second frame relative to the first end of the first frame, a support adapted to support the vibrator, said support including means between the support and the base plate allowing vertical movement of the plate relative to the support, but preventing rotational movement of the plate relative to the support about a vertical axis, lifting and lowering means connected between the vibrator and the support for lifting the vibrator for carrying and lowering the vibrator for surveying, vertical guide rods connected between the support and the vibrator for guiding the vertical movement of the vibrator, locking means on the second frame for supporting and locking the support to the second frame in the longitudinal opening, and coacting engaging surfaces between the support and the first frame adapted to engage when the support is locked to the second frame.

9. The apparatus of claim 8 wherein said engaging surfaces include wedge shaped surfaces at each end of the support for guiding and securing said support.

10. The apparatus of claim 9 wherein the coacting surfaces at the end of the support nearest the first end of the frames includes a portion releasably connected to the frame.

11. The apparatus of claim 8 wherein the lifting and lowering means are pivotally connected to the support.

12. The apparatus of claim 8 including said guide means including a guide sleeve and a rod, said rod including a hole adapted to be positioned adjacent the lower end of the sleeve when the vehicle is raised off the ground, and pin means adapted to fit in said hole to hold the vehicle off the ground.

* * * * *